United States Patent [19]
Jasuja et al.

[11] Patent Number: 5,802,523
[45] Date of Patent: Sep. 1, 1998

[54] METHOD AND APPARATUS FOR REDUCING THE MEMORY REQUIRED TO STORE BIND VARIABLE DESCRIPTORS IN A DATABASE

[75] Inventors: Amit Jasuja, Fremont; Roger Taranto, Berkeley, both of Calif.

[73] Assignee: Oracle Corporation, Redwood Shores, Calif.

[21] Appl. No.: 669,244

[22] Filed: Jun. 21, 1996

[51] Int. Cl.$^6$ .................................................. G06F 17/30
[52] U.S. Cl. .......................... 707/103; 707/10; 395/710
[58] Field of Search .................................. 707/103, 101, 707/102, 10; 395/705, 710

[56] References Cited

U.S. PATENT DOCUMENTS

| 5,220,665 | 6/1993 | Coyle, Jr. et al. | 395/671 |
| 5,627,959 | 5/1997 | Brown et al. | 345/356 |

OTHER PUBLICATIONS

"Using SQL with Statements with SAL", Data Based Advisor, v1, Doug Goddard, n7, p. 104(2), Dialog File 275, Supply No. 155565705, Jul. 1994.

"The MicroSoft Relational Engine", Goez Graefe, Proceeding of the Data Engineering 1996 12th International, Los Alamitos, CA, Feb. 1996.

Oracle, "Oracle 7 Server, Concepts Manual", Ch. 1, 9, 10, 11, 14, 19, & 21, Dec. 1992.

Oracle "Oracle & Server, SQL Language Reference Manual", Ch 3 pp. 48–56, Ch. 4 pp. 234–247, 286–297, 317–324, 331–332, 356–382, 399–404, 409–411, Dec. 1992.

*Primary Examiner*—Thomas G. Black
*Assistant Examiner*—Hosain T. Alam
*Attorney, Agent, or Firm*—Blakely, Sokoloff, Taylor and Zafman

[57] ABSTRACT

The present invention discloses a method and apparatus for reducing the memory required to store bind variable descriptors in a database system. In embodiments of the invention, bind variable descriptors continue to be maintained in the shared cursor objects, but bind variables are no longer maintained in the instantiation objects. If the bind variables associated with an instantiation object are accurately described by the bind variable descriptors in a shared object to which the instantiation object is linked, then only data indicating the bind variables associated with the instantiation object are accurately described is maintained in the instantiation object. In contrast, if the bind variable descriptors associated with an instantiation object are not accurately described, only data describing how the attributes of the bind variables associated with the instantiation object differ from those associated with the shared cursor object are maintained in the instantiation object.

32 Claims, 7 Drawing Sheets

METHOD AND APPARATUS FOR REDUCING THE MEMORY REQUIRED TO STORE BIND VARIABLE DESCRIPTORS IN A DATABASE

BACKGROUND OF THE INVENTION

1. Field of the invention

The present invention relates to database management systems, and more specifically, to a method and apparatus for allocating memory for bind variable descriptors.

2. Background information

Many database systems take advantage of distributed processing by using a client-server architecture. In this architecture, the database is divided into two parts: a client portion a server portion. The client portion is the front end database application that interacts with the users through keyboards, displays, and pointing devices such as mice. The client portion concentrates on requesting, processing, and presenting data managed by the server portion. The server portion runs server software and handles the functions required for concurrent, shared data access. Of course, the client-server architecture can be distributed across a network. For example, each of the client applications may be executed at a different node of the network, while one or more other nodes on the network are used for storing the database and executing the server software to process database requests sent by users at the client nodes.

In typical database systems, client applications store, update and retrieve information by submitting commands to the server portion. To be correctly processed, the commands must comply with the database language that is supported by the server portion. One popular database language is known as Structured Query Language (SQL). To compile and execute SQL statements, the server portion includes an SQL engine. In response to receiving SQL statements originating from the client applications, the server portion compiles and executes the SQL statements to perform the required operations on the information in the database.

In addition to the SQL language, it is advantageous to support the procedural functionality of a structured programming language. For purposes of illustration, this document describes the procedural language extension to SQL (PL/SQL) developed by Oracle Corporation. Of course, any procedural language extension may be used. A PL/SQL engine for compiling and executing routines (e.g., packages, procedures, functions, etc.) written in PL/SQL can be linked in either or both of the client and server sides. A PL/SQL routine may include PL/SQL statements or both PL/SQL and SQL statements. Having a PL/SQL engine on the server side allows clients to submit to the server portion individual PL/SQL statements, blocks of PL/SQL statements, and blocks of PL/SQL statements that include SQL statements. Having a PL/SQL engine on both the client and the server sides additionally allows clients to call PL/SQL routines stored on the server side.

Various database languages (e.g., SQL, PL/SQL, etc.) support a special-purpose construct referred to as a "cursor." A cursor is a handle (a name or pointer) to the set of data produced in response to executing a specific query statement. The SQL and PL/SQL languages include a number of statements for manipulating cursors. As an example, the PL/SQL language includes a declaration statement, an OPEN statement, a FETCH statement, and a CLOSE statement. A cursor body is defined using the following syntax:

CURSOR cursor_name [(parameter[, parameter, ... ])] IS<sql query>;

where [ ] indicates optional and <sql query> is a legal SQL query. An example of a format for a legal SQL query is:

SELECT {column_name[, column_name, ... ]|*} FROM table_name [WHERE predicate|parameterized predicate];

where | indicates "or" and * indicates all columns of the selected tables. The text starting with "SELECT" is referred to as the select statement. The part of the query following "WHERE" is referred to as the where clause or predicate. The predicate is a set of search criteria for accessing data from the database. For example, the predicate empno>2 would return the rows containing a value greater than 2 in the column empno. The predicate may optionally be parameterized. A parameterized predicate allows the set of search criteria to be varied based on one or more "bind variables" (e.g., empno>x, where x is a bind variable), also referred to herein as input variables. By changing the value of the bind variables during runtime, the rows returned from the database using the cursor may be varied as allowed by the predicate selected when the cursor is defined.

The set of rows returned in response to execution of a query is called the active set. The size of an active set is the number of rows that meets the search criteria of the query. To provide an example of the operation of cursors, an exemplary database table is shown below in Tables 1. As shown in Table 1, the database table employee_info includes columns for the employee's name (ename), number (empno), department (dept), and salary.

TABLE 1

| ename | empno | dept | salary |
|---|---|---|---|
| Jeff | 1 | 10 | 20,000 |
| Jim | 2 | 20 | 10,000 |
| Joe | 3 | 20 | 12,000 |
| Jack | 4 | 30 | 50,000 |

Thus, the statement:

CURSOR cursor1 IS SELECT ename, empno FROM employee_info;

would generate a cursor that could to be used to access the active set shown below in Table 2. As shown in Table 2, the active set includes the ename and empno columns from the table employee-info.

TABLE 2

| ename | empno |
|---|---|
| cursor1 —> Jeff | 1 |
| Jim | 2 |
| Joe | 3 |
| Jack | 4 |

The OPEN, FETCH, and CLOSE statements are used to control cursors. In response to the OPEN statement, the server portion of the database executes the query associated with the cursor, identifies the active set, and positions the cursor before the first row. The FETCH statement causes the server portion to advance the cursor one row, retrieve the data in the current row, and store the retrieved data in the specified variables. The FETCH statement has the following format:

FETCH cursor_name INTO {record_name|variable_name[, variable_name, ... ]};

where record_name represents a previously defined record variable and the one or more variable_names represent one or more simple variables. The text of a FETCH statement starting at "INTO" is referred to as the INTO-clause. The CLOSE statement disables the cursor.

It is not uncommon for a large number of client applications to be connected to a server and for each of these client applications to require one or more cursors. In one prior art database system, the server separately generates and stores the code and data required for each cursor requested by the client applications connected to that server. Depending on the characteristics of a cursor, implementing that cursor using the prior art database system can require a large amount of memory. One type of data that is stored for a cursor that requires a relatively large amount of memory is referred to as the "bind variable descriptors." The bind variable descriptors are data describing the attributes (e.g., the data types, lengths, precision, scale, etc., but not the values) of the bind variables associated with a query. Since the amount of memory available to a server directly affects the number of client applications that can access the server and/or the performance of the server, the large amount of memory required to implement cursors using database systems that separately store the code and data required for each cursor degrades the performance of that database system.

SUMMARY

A method and apparatus for reducing the memory required to store bind variable descriptors in a database system is described. In embodiments of the invention, bind variable descriptors continue to be maintained in the shared cursor objects, but bind variable descriptors are no longer maintained in the instantiation objects. In one embodiment of the invention, if the bind variables associated with an instantiation object are accurately described by the bind variable descriptors in a shared cursor object to which the instantiation object is linked, then only data indicating that the bind variables associated with the instantiation object are accurately described is maintained in the instantiation object. In contrast, if the bind variables associated with an instantiation object are not accurately described by the bind variable descriptors in the shared cursor object to which the instantiation object is linked, only data describing how the attributes of the bind variables associated with the instantiation object differ from those associated with the shared cursor object is maintained in the instantiation object.

In alternative embodiments in which an instantiation object can only be linked to a shared cursor object that is associated with bind variables having attributes that are identical to the attributes of the bind variables associated with that instantiation object, data does not need to be maintained in an instantiation object indicating whether the bind variables associated with that instantiation object are accurately described by the bind variable descriptors in the shared cursor object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for reducing the memory required to store bind variable descriptors in a database system is described. In the following description, numerous specific details are set forth to provide a thorough understanding of the invention. However, it is understood that the invention may be practiced without these specific details. In other instances, well-known circuits, structures and techniques have not been shown in detail in order not to obscure the invention. Although SQL and PL/SQL are used throughout this document to describe an implementation of a database, the invention could be implemented in systems that use any number of other database languages.

HARDWARE OVERVIEW

Figure 1:
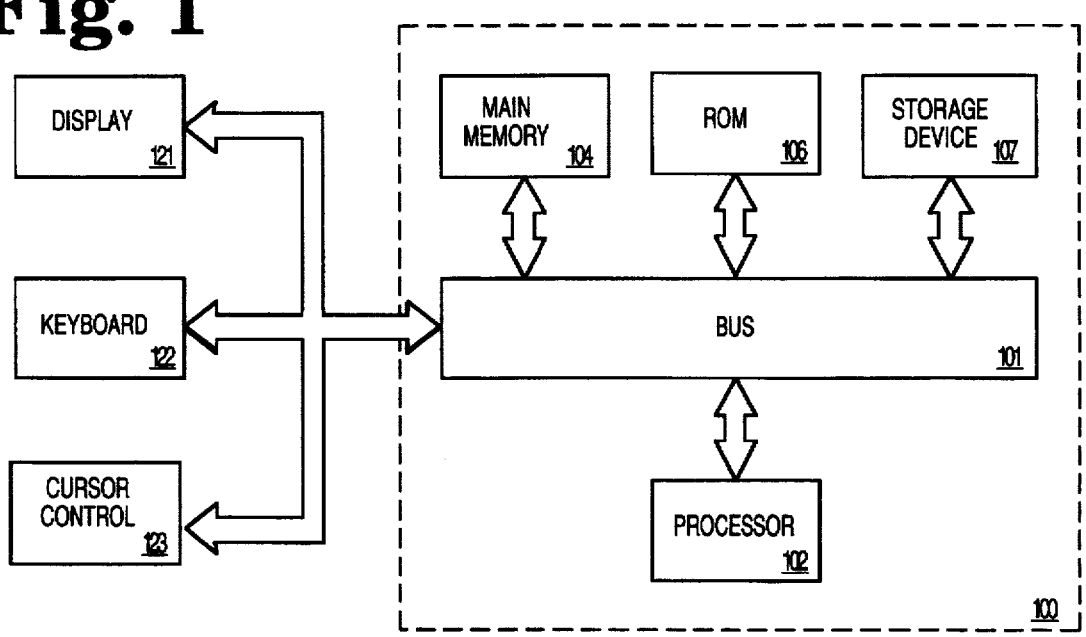
FIG. 1 is a block diagram illustrating an exemplary computer system upon which the invention can be implemented.

FIG. 1 is a block diagram illustrating an exemplary computer system 100 upon which the invention can be implemented. The computer system 100 comprises a bus or other communication means 101 for communicating information, and a processing means 102 coupled with the bus 101 for processing information. The computer system 100 further comprises a random access memory (RAM) or other dynamic storage device 104 (referred to as main memory), coupled to the bus 101 for storing information and instructions to be executed by the processor 102. A main memory 104 also may be used for storing temporary variables or other intermediate information during execution of instructions by the processor 102. The computer system 100 also comprises a read only memory (ROM) and/or other static storage device 106 coupled to the bus 101 for storing static information and instructions for the processor 102. A data storage device 107, such as a magnetic disk or optical disk and its corresponding disk drive, may also coupled to the bus 101 for storing information and instructions.

The computer system 100 can also be coupled via the bus 101 to a display device 121, such as a cathode ray tube (CRT), for displaying information to a computer user. An alphanumeric input device 122, including alphanumeric and other keys, is typically coupled to the bus 101 for communicating information and command selections to the processor 102. Another type of user input device is cursor control 123, such as a mouse, a trackball, or cursor direction keys for communicating direction information and command selections to the processor 102 and for controlling cursor movement on the display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack the keyboard 122, wherein all interface is provided via the stylus as a writing instrument (like a pen) and the written text is interpreted using optical character recognition (OCR) techniques.

In one embodiment, the invention is related to the use of the computer system 100 to implement a database requiring less memory for the storage of bind variable descriptors. In this embodiment, the memory required for storing bind variable descriptors is allocated, accessed, and deallocated by the computer system 100 in response to the processor 102 executing sequences of instructions contained in the memory 104 as described later herein. In alternative embodiments, hard-wired circuitry may be used in place of or in combination with software instructions to implement the invention. Thus, the invention is not limited to any specific combination of circuitry and software. Furthermore, while the invention is being described with reference to a computer system having one computer with one processor, the invention may be implemented on a computer system that includes a network of computers each having one or more processors.

ORACLE 7.0

Figure 2A:
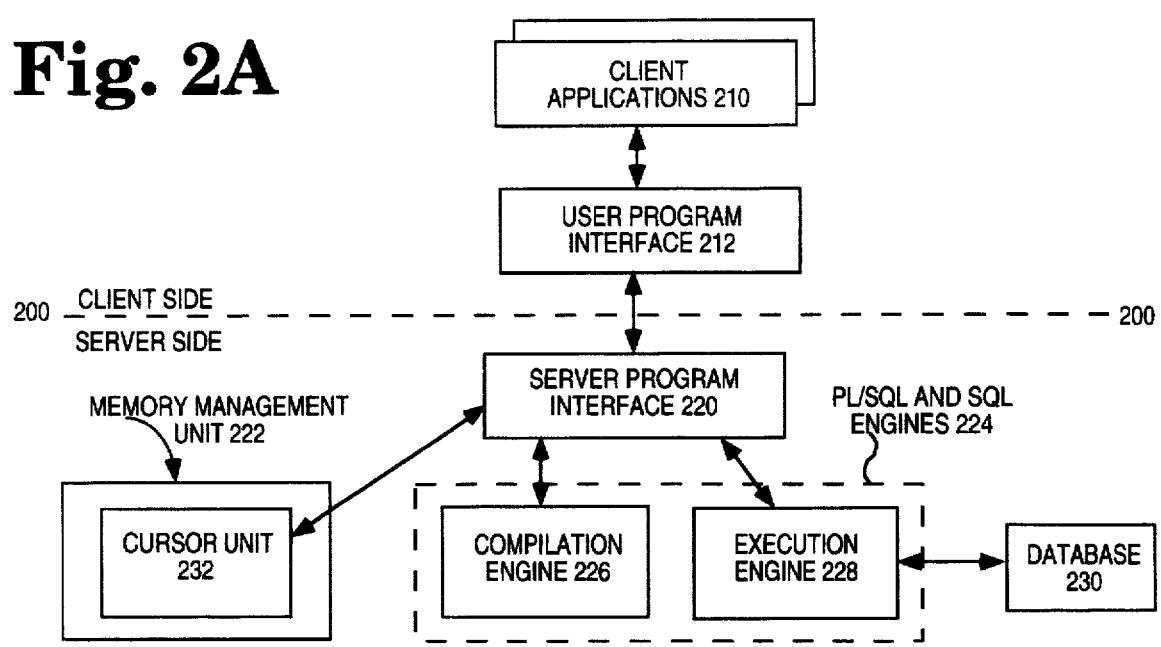
FIG. 2A is a block diagram illustrating the client-server architecture of a database management system implemented in Oracle version 7.0.

FIG. 2A is a block diagram illustrating the client-server architecture of a database management system implemented in Oracle version 7.0. A technique described below and referred to herein as "shared cursors" was implemented in Oracle 7.0 to reduce the amount of memory required to implement cursors. Although Oracle 7.0 was available for license prior to May 22, 1996, the concept of shared cursors was not disclosed. Each of the elements in FIG. 2A illustrate one or more routines for execution on a processor. FIG. 2A shows a line 200 dividing the database architecture into a client side and a server side. On the client side, there resides a set of one or more client applications 210. These client applications 210 communicate with the server side through a "program interface." The program interface includes a user program interface 212 on the client side, and a server program interface 220 on the server side. The program interface formats information requests from the client side, passes data between the client and server sides, and traps and returns errors. In addition, the program interface converts and translates data, particularly between different types of computers and between the data types of columns in database tables and the data types used by the client applications. The communications between the user program interface 212 and the server program interface 220 may be across a network.

The server program interface 220 coordinates the execution of PL/SQL and SQL statements from the client applications 210 and the return of data from the database to the client applications 210. An example of the server program interface 220 is the Oracle program interface. To execute PL/SQL and SQL statements received from the client applications 210, the server program interface 220 interacts with a memory management unit 222, as well as PL/SQL and SQL engines 224.

In one implementation of the database, the PL/SQL and SQL engines are implemented separately (not shown), but they work together to execute PL/SQL and SQL statements. The PL/SQL and SQL engines 224 include a compilation engine 226 for compiling the PL/SQL and SQL statements received by the PL/SQL and SQL engines 224. In the implementation having separate PL/SQL and SQL engines, the compilation engine 226 represents separate PL/SQL and SQL compilation engines. During compilation, the compilation engine 226 calls the appropriate routines in the memory management unit 222 to allocate memory for the various clients connected to the sever. The compilation engine 226 generates compiled code blocks for execution. One compiled block of code can represent one or more PL/SQL and/or SQL statements.

In addition to the compilation engine 226, the PL/SQL and SQL engines 224 include an execution engine 228 for executing the compiled code blocks generated by the compilation engine 226. In addition to accessing the compiled code blocks, the execution engine 228 may also receive user input (not shown). Again, in the implementation having separate PL/SQL and SQL engines, the execution engine 228 is implemented as separate PL/SQL and SQL execution engines. During the execution of the compiled code blocks, the execution engine 228 manipulates the data stored in a database 230.

The memory management unit 222 handles the allocation and deallocation of memory. In one implementation, the memory management unit 222 maintains a user memory space and a shared memory space. The memory for data and/or code accessible by a single client application is allocated from the user memory space, while the memory for data and/or code accessible by multiple client applications is allocated from the shared memory space. An alternative implementation of the memory management unit 222 carves the user memory space out of the shared memory space. For purposes of consistency, this document describes the implementation that utilizes separate user and shared memory spaces.

The memory management unit 222 includes a cursor unit 232 for handling cursors. The cursor unit 232 allocates memory associated with cursors, and stores certain of the data for those cursors in that memory. While in one implementation the cursor unit 232 tracks memory allocated for cursors using a linked list, alternative implementations could use any number of mechanisms. For example, an alternative implementation could use a collection of pointers stored in one or more data structures.

Typically, many client applications require the execution of the same queries with different values and/or different lengths for the bind variables associated with those queries. The length of a bind variable is the amount of memory allocated to store the value assigned to that bind variable. Since the creation and storage of an execution plan for a cursor is expensive, one approach to implementing cursors is to re-use the same cursor execution plan for cursors that differ, if at all, only with respect to the values and lengths of the bind variables for their respective queries. To allow for the sharing of cursor execution plans, the server portion of Oracle version 7.0 divides the data and code required for a cursor into a client specific part (referred to herein as the "instantiation object" or the "private object") and a shared part (referred to herein as the "shared cursor object"). Thus, a cursor is made up of the instantiation object created for that cursor and the shared cursor object linked to that instantiation object. The concept of sharing cursor execution plans is referred to herein as "shared cursors."

Figure 2B:
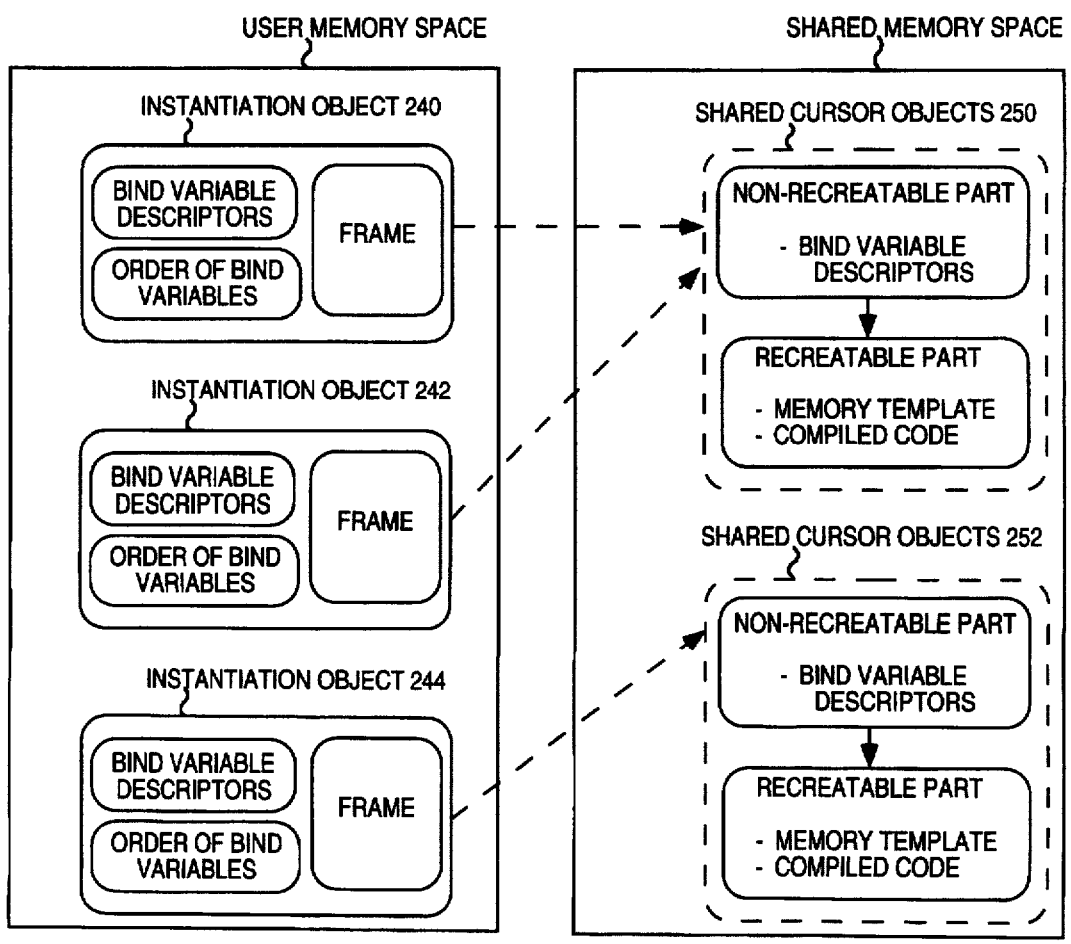
FIG. 2B is a block diagram illustrating certain example database objects utilized by Oracle version 7.0.

FIG. 2B is a block diagram illustrating certain example database objects utilized by Oracle version 7.0. FIG. 2B shows instantiation objects 240, 242, and 244, as well as shared cursor objects 250 and 252. The memory associated with the shared cursor objects is allocated from the shared memory space, and is therefore accessible to all client applications. Each shared cursor object contains the execution plan for the cursor for which the shared cursor object was originally created. The execution plan includes the compiled code to implement the cursor and a memory template. The memory template stores the size of the memory area (referred to herein as a frame) required to store the data specific to the cursor (e.g., the value of the bind variables for the query), as well as the offsets into such a frame for each piece of data. Each time the compiled code associated with a shared cursor is executed, a separate frame is allocated and the offsets in the memory template are used to access the frame.

Since shared cursor objects require a large amount of memory, each shared cursor object is divided into a recreateable part and a non-recreateable part. The recreateable part of a shared cursor object includes data and code that can be recreated using the data stored in the non-recreateable part of that shared cursor object. If memory is required and a shared cursor object is not currently in use, the memory for the recreateable part of the shared cursor object may be deallocated.

In one implementation, the recreateable part associated with a shared cursor object includes the execution plan for the cursor and a parsed representation of the query that resulted in the initial creation of the shared cursor object. In contrast, the non-recreateable part includes, among other things, the following: 1) the language and optimizer environment to be used when compiling the code associated with the shared cursor object; 2) the national language support format; 3) the date format; 4) the privilege domain; 5) the SQL statement (e.g. the query) for which the compilation is being created; 6) the bind variable descriptors for the query for which the shared cursor object was created; and 7) a reference (e.g., a pointer, a unique integer value, etc.) to the instantiation object for which the shared cursor object was originally created. The non-recreateable part may also include other information which is not necessary to understanding the invention.

The memory associated with the instantiation object is allocated from the user memory space, and is therefore private to the requesting client application. The memory allocated for each instantiation object is used for storing information specific to the requesting client application and/or the query for which the instantiation object was created. For example, each instantiation object includes a bind variable descriptor for each bind variable in the query associated with that instantiation object, as well as data describing the order in which information relevant to those bind variables will be transmitted to and received from the client application. FIG. 2B shows that each of the instantiation objects 240, 242, and 244 contain the bind variable descriptors for the respective queries for which that instantiation object was created. The bind variable descriptors stored in an instantiation object are used for interpreting, converting, and transmitting the values of the bind variables between the client application and the shared cursor object.

In addition, each instantiation object contains a reference to the shared cursor object to which that instantiation object is currently associated. For example, dashed lines in FIG. 2B illustrate that the instantiation objects 240 and 242 are currently associated with the shared cursor object 250, while the instantiation object 244 is currently associated with the shared cursor object 252. Furthermore, each instantiation object includes information concerning the memory allocated for the instantiation object (including the frame), the control of the frame required for the execution of the query associated with the instantiation object, and the privilege domain associated with the instantiation object. An instantiation object is maintained until the cursor for which that instantiation object was created is closed.

It is worthwhile to note that the data structures and format of the bind variable descriptors stored in the shared cursor objects and the instantiation objects need not be the same. For example, in one implementation the bind variable descriptors stored as part of both the shared cursor object and the instantiation object describe the data type, length, precision (used for numeric bind variables), and scale (used for numeric bind variables) of each bind variable. Of course, additional data that is not necessary to understanding the invention may be stored as part of the bind variable descriptors in either or both of a shared cursor object and an instantiation object. In one implementation, the bind variable descriptors stored as part of a shared cursor object are stored in the following structures: 1) an array containing the data type of each bind variable; 2) an array containing the length of each bind variable; 3) an array containing the precision of each bind variable; and 4) an array containing the scale of each bind variable. In contrast, the bind variable descriptors stored as part of an instantiation object are stored in an array of records, each bind variable descriptor being stored in one element of the array.

In this document, the attributes of the bind variables for a query are said to be associated with the cursor created to execute that query, as well as being associated with the instantiation object created for that cursor. In contrast, only the attributes of the bind variables described by the bind variable descriptors stored in a shared cursor object are referred to as the attributes of the bind variables associated with that shared cursor object. Thus, as previously described, the attributes of the bind variables associated with a cursor may differ from the attributes of the bind variables associated with that cursor's shared cursor object.

Table 3 illustrates example pseudo SQL statements and corresponding pseudo PL/SQL statements, which when executed by a client, cause a cursor to be created. Of course, additional statements could be intermixed with the exemplary statements shown in Table 3. For purposes of this description, the steps performed in response to the execution of the pseudo SQL statements will be described. Execution of the statements "bind_variable, department INTEGER", "value POINTER INTEGER" and "name CHAR" cause four variables to be created for the client application executing on the client side. Execution of the next couple statements causes the value of bind_variable to be set to 20 and the pointer *value to point to the memory area storing the data now associated with bind_variable.

TABLE 3

| Pseudo SQL Statements | Pseudo PL/SQL Statements |
|---|---|
| DECLARE<br>bind_variable, department INTEGER;<br>value POINTER INTEGER;<br>name CHAR;<br>bind_variable = 20;<br>*value = bind_variable;<br>OPEN cursor2;<br><br>PARSE cursor2 SELECT ename, dept FROM employee_info WHERE dept =: bind_variable;<br><br>BIND (cursor_name, 0, <bind variable descriptor for bind_variable>, *value);<br>EXECUTE cursor2;<br>FETCH cursor2 INTO name, department; | DECLARE<br>bind_variable, department INTEGER;<br>value POINTER INTEGER;<br>name CHAR;<br>bind_variable = 20;<br>*value = bind_variable;<br>CURSOR cursor2 IS SELECT ename, dept FROM employee_info WHERE dept =: bind_variable;<br><br>OPEN cursor2;<br><br>FETCH cursor2 INTO name, department; |

The server program interface 220 allocates a data structure (referred to herein as a "cursor array") for each client connected to the server. In response to execution of the SQL OPEN statement in Table 3, data is transmitted from the client application to the server program interface 220, which in turn searches for an unused entry in the cursor array for the cursor named cursor2. If an unused entry is available, the server program interface 220 stores in that entry the required data for that cursor (e.g., cursor status information such as opened, closed, etc.; cursor state information such as parsed, bound, etc.). If all entries in the cursor array are being used, the cursor cannot be opened. When the cursor is closed, the associated entry in the cursor array is released.

In response to executing the SQL PARSE statement, the necessary data is transmitted to the server program interface 220 to begin the creation of an instantiation object and, if required, a shared cursor object for the cursor named cursor2. The query defined by the PARSE statement in Table 3 associates cursor2 with the rows from the columns ename and dept in the table employee_info in which the value in the dept column matches the value of bind_variable.

In response to receiving data generated upon execution of the PARSE statement by the client application, the server program interface 220 causes the cursor unit 232 to create an instantiation object for the cursor and store the bind variable descriptor for bind_variable in that instantiation object. In addition, the server program interface 220 causes the cursor unit 232 to determine if any of the existing shared cursor objects can be used to execute the requested query. If an existing shared cursor object cannot be used for the requested query, the compilation engine 226 creates a new shared cursor object for the requested cursor. Whether an existing shared cursor object is selected or a new shared cursor object is created, a reference (e.g., a pointer, a unique identifier, etc.) is stored in the instantiation object to create a link to associate the instantiation object with that shared cursor object.

In one implementation, determining if an existing shared cursor object can be used for the requested query requires comparing data stored in the instantiation object with the data stored in the non-recreateable part of the existing shared cursor objects. A number of aspects associated with the instantiation object and an existing shared cursor object must match in order for the existing shared cursor object to be used (e.g., the SQL statement type, the language and optimizer environment, the national language, etc.). In particular, the query associated with the instantiation object and the query associated with an existing shared cursor object must be identical, with the exception of the values and length of the bind variables for those queries. Thus, the attributes of the bind variables associated with an instantiation object and a shared cursor object must be identical, with the exception of the length of the bind variables. To determine if the attributes of the bind variables for the requested query and an existing shared cursor object match, the bind variable descriptors stored in the instantiation object and the non-recreateable part of the existing shared cursor object are compared.

As for the length of the bind variables, either: 1) one or more of the bind variables for the requested query are longer than the corresponding bind variables for the query associated with the shared cursor object; or 2) none of the bind variables for the requested query are longer than the corresponding bind variables for the query associated with the shared cursor object.

If one or more bind variables for the requested query are longer than the corresponding bind variables for the query associated with the shared cursor object, then the existing shared cursor object cannot be used for the requested query and the compilation engine 226 creates a new shared cursor object. Since the bind variables of the new shared cursor object are longer than the bind variables of the existing shared cursor object, the new shared cursor object can be used to execute the queries associated with the existing shared cursor object. Since the new shared cursor object can be used to execute the queries associated with the existing shared cursor object, the cursor unit 232 causes the queries originally associated with the existing shared cursor object to be linked to the new shared cursor object. Once all of the queries from the existing shared cursor object have been associated with the new shared cursor object, the existing shared cursor object is deallocated.

If none of the bind variables for the requested query are longer than the corresponding bind variables for the query associated with the shared cursor object, then the existing shared cursor object is used. If one or more bind variables for the requested query are shorter than the corresponding bind variables for the query associated with the shared cursor object, additional data is stored in the instantiation object indicating the lengths of the bind variables associated with the shared cursor object. Since the length of the values sent by the client application for one or more of the bind variables will be shorter, in one embodiment the cursor unit 232 appropriately increases the length of the values associated with the shorter bind variables that are sent from the client application (e.g., pad the values for the bind variables received from the client with zeros to make the values the appropriate size for the bind variables associated with the shared cursor object). In an alternative embodiment, the complied code generated for the cursor determines the length of a bind variable prior to accessing the value associated with that bind variable and accesses only up to the identified length. While certain techniques have been described for accessing shorter bind variables, alternative embodiments could use any number of other techniques.

In addition to handling the bind variables in response to a PARSE statement, the server program interface 220 also performs additional functions which are not necessary to understanding the invention (e.g., certain aspects of the "define descriptors" are handled).

When the SQL BIND statement is executed by the client application, the necessary data to bind the bind_variable is transmitted to the server program interface 220. In response, the server program interface 220 causes the cursor unit 232 to store the appropriate information in the instantiation object. The data associated with the arguments of the BIND statement in Table 3 are as follows: 1) "cursor2" identifies the cursor for which the BIND statement applies and is used to identify the instantiation object associated with that cursor; 2) the "1" is an integer value indicating the position of bind_variable in the predicate; 3) "<bind variable descriptor>" represents the bind variable descriptor for bind_variable; and 4) *value is the pointer to the memory area storing the value of bind_variable.

The use of a pointer to the bind variable in a BIND statement (e.g., the BIND statement used in Table 3 ) is referred to as a "bind by reference." In one implementation, the database also supports BIND statements having a integer value indicating the position in the SQL statement of the bind variable being bound (referred to as bind by position) and BIND statements having the name of the bind variable used in the SQL statement being bound (referred to as bind by name). Of course, alternative implementations could support any combination of bind by reference, bind by position, and bind by name. In addition to handling the bind variables in response to a BIND statement, the server program interface 220 also performs additional functions which are not necessary to understanding the invention (e.g., certain aspects of the define descriptors are handled).

When the SQL EXECUTE statement is executed by the client application, the necessary data to execute the query associated with the cursor named cursor2 is transmitted to the server program interface 220. In response, the server program interface 220 causes the cursor unit 232 to locate the instantiation object for the cursor named cursor2. In addition, the server program interface 220 causes the cursor unit 232 to allocate the frame required for execution of the query and associates that frame with that instantiation object. Using the information stored in the instantiation object, the server program interface 220 accesses the shared cursor object linked to that instantiation object and determines if the recreateable part of that shared cursor object is present. The recreateable part associated with the shared cursor object will be present if an existing shared cursor object was selected and the recreateable part of that shared cursor object has already been created and not subsequently deallocated. If the recreateable part associated with the shared cursor object is not present, the server program interface 220 causes the compilation engine 226 to allocate memory for the recreateable part of the shared cursor object and to perform the required compilation. Once the required frame and recreateable part associated with the shared cursor object is available, the server program interface 220 causes the execution engine 228 to execute the query using the instantiation object and the shared cursor object. Execution of the query results in the identification of active set the satisfies that query.

When the SQL FETCH statement is executed by the client application, the necessary data to access the current row from the active set identified by the cursor is transmitted to the server program interface 220. In response, the server program interface 220 accesses the instantiation object for the cursor named cursor2. Using the information stored in the instantiation object and the associated shared cursor object, the server program interface 220 causes the execution engine 228 to access the current row from the active set identified by the query and returns the data to the requesting client application. In response, the client application stores the data in the data structure(s) of the INTO-clause. Since the mechanism for performing a FETCH is well known, it is not further described here.

Subsequent instructions of the source code shown in Table 3 could cause any number of actions to be taken. For example, the source code could include one or more statements that cause the value of bind_variable to be altered and the cursor named cursor2 to be re-executed. Thus, the source code could include the statement "bind_variable=bind_variable+10" which would cause the value of bind_variable to be altered from 20 to 30. In addition, the source code could include one or more statements that cause the control of execution to return to the BIND statement or the EXECUTE statement. Regardless of whether the control of execution returns to the BIND statement or the EXECUTE statement, the database is implemented to cause the active set to be altered due to the alteration of the value of bind_variable.

While only one bind variable is shown in Table 3, client applications often request cursors for queries having large numbers of bind variables. For example, it is not uncommon for a query to require over a thousand bind variables. In addition, it is not uncommon for a hundred clients to open the same query. Since each bind descriptor for a bind variable requires 68 bytes, a large amount of memory is required for storing the bind descriptors in both the instantiation objects and the shared cursor objects. Since the amount of available memory directly affects the number of client applications that can access the server and/or the performance of the server, the large amount of memory required for bind variable descriptors degrades performance of the database.

DESCRIPTORLESS INSTANTIATION OBJECTS

In embodiments of the invention, bind variable descriptors continue to be maintained in the shared cursor objects, but bind variable descriptors are no longer maintained in the instantiation objects. In one embodiment of the invention, if the bind variables associated with an instantiation object are accurately described by the bind variable descriptors in a shared cursor object to which the instantiation object is linked, then only data indicating that the bind variables associated with the instantiation object are accurately described is maintained in the instantiation object. In contrast, if the bind variables associated with an instantiation object are not accurately described by the bind variable descriptors in the shared cursor object to which the instantiation object is linked, only data describing how the attributes of the bind variables associated with the instantiation object differ from those associated with the shared cursor object is maintained in the instantiation object.

For example, if the attributes of the bind variables for the instantiation object and the shared cursor object are the same except that one or more bind variables associated with the instantiation object are shorter than the corresponding bind variables of the shared cursor object, then only data indicating the differing lengths would be maintained in the instantiation object. The data indicating the differing lengths could be stored in the instantiation object using any number of data storage formats. For example, the lengths for all the bind variables for the query could be stored in the instantiation object. As another example, only data identifying the position(s) in the predicate of the bind variable(s) having differing lengths, as well as the lengths of those bind variable(s), could be stored in the instantiation object. Thus, the invention is not limited to the storage format used for storing the data indicating the differences between the attributes of the bind variables associated with an instantiation object and the shared cursor object to which that instantiation object is linked.

Since the data required to describe the differences, if any, between the attributes of the bind variables associated with an instantiation object and a shared cursor object is much smaller than the bind variable descriptors, the amount of memory required to store bind variable descriptors can be greatly reduced. For example, it is not uncommon for a hundred clients to request a cursor for a query having over a thousand bind variables. The hundred cursors may be implemented using a single shared cursor object and a hundred instantiation objects. While the bind variable descriptors for the bind variables are stored as part of the shared cursor object, each of the hundred instantiation objects would only store data describing the differences, if any, between the attributes of the bind variables associated with the shared cursor object and the attributes of the bind variables associated with that instantiation object. As a result, the number of sets of bind variable descriptors stored is reduced from one hundred and one to one. Since the amount of available memory directly affects the number of client applications that can simultaneously access a server, the performance of the database is improved by reducing the memory required for storing bind variable descriptors.

In alternative embodiments in which an instantiation object can only be linked to a shared cursor object that is associated with bind variables having attributes that are identical to the attributes of the bind variables associated with that instantiation object, data does not need to be maintained in an instantiation object indicating whether the bind variables associated with that instantiation object are accurately described by the bind variable descriptors in the shared cursor object.

MECHANISM FOR IMPLEMENTING DESCRIPTORLESS INSTANTIATION OBJECTS

Figure 3A:
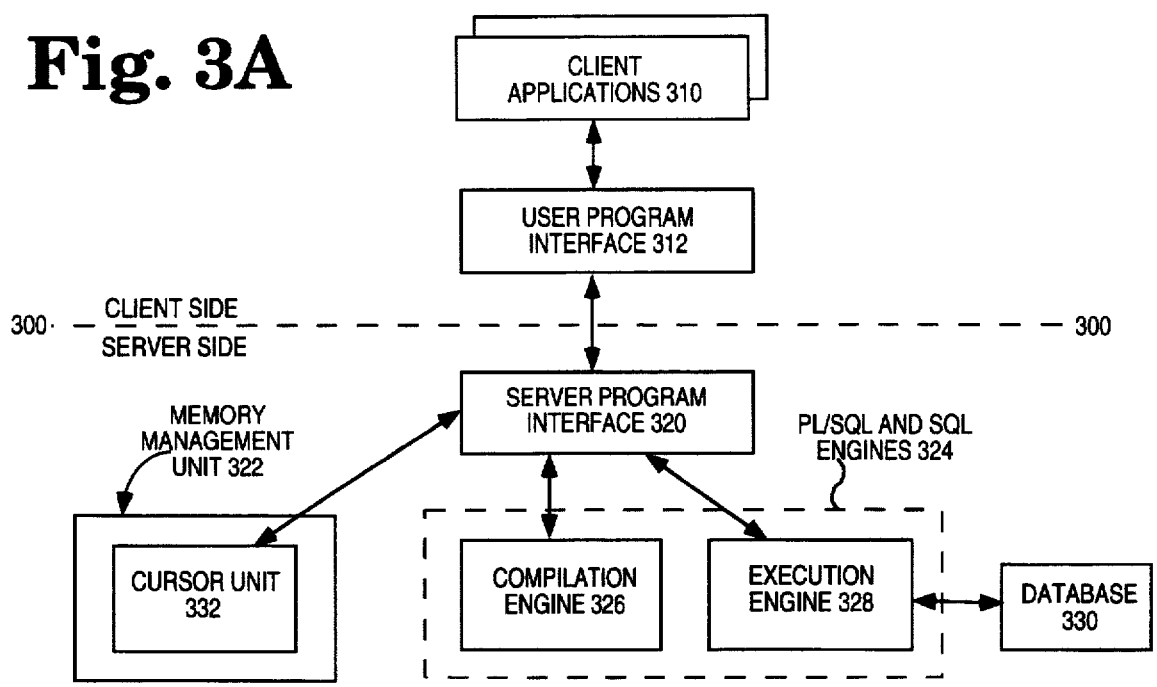
FIG. 3A is a block diagram illustrating the client-server architecture of a database management system according to one embodiment of the invention.

FIG. 3A is a block diagram illustrating the client-server architecture of a database management system according to one embodiment of the invention. The client-server architecture shown in FIG. 3A is similar to that of the client-server architecture shown in FIG. 2A. For example, FIG. 3A shows a line 300 dividing the database architecture into a client side and a server side. In addition, FIG. 3A includes a number of elements (a set of client applications 310; a user program interface 312; a server program interface 320; a memory management unit 322 containing a cursor unit 332; PL/SQL and SQL engines 324 containing a compilation engine 326 and an execution engine 328; and a database 330) that perform the same or similar functions as like named elements in FIG. 2A.

Thus, like the memory management unit 222 of FIG. 2A, the memory management unit 322 maintains a user memory space and a shared memory space in one embodiment of the invention. However, in alternative embodiments, the memory management unit 322 could be implemented to allocate the memory available to the server in a different manner. For example, in an alternative embodiment the memory management unit 322 could be implemented to carve the user memory space out of the shared memory space. For purposes of consistency, this document describes an implementation that utilizes separate user and shared memory spaces.

Since similarly named elements in FIGS. 2A and 3A perform the same or similar functions, only the difference between the elements in FIGS. 2A and 3A required to implement the invention are described herein. While the invention is described with reference to one database architecture, any number of database architectures could utilize the present invention. Thus, the invention is not limited to the database architecture described herein.

Figure 3B:
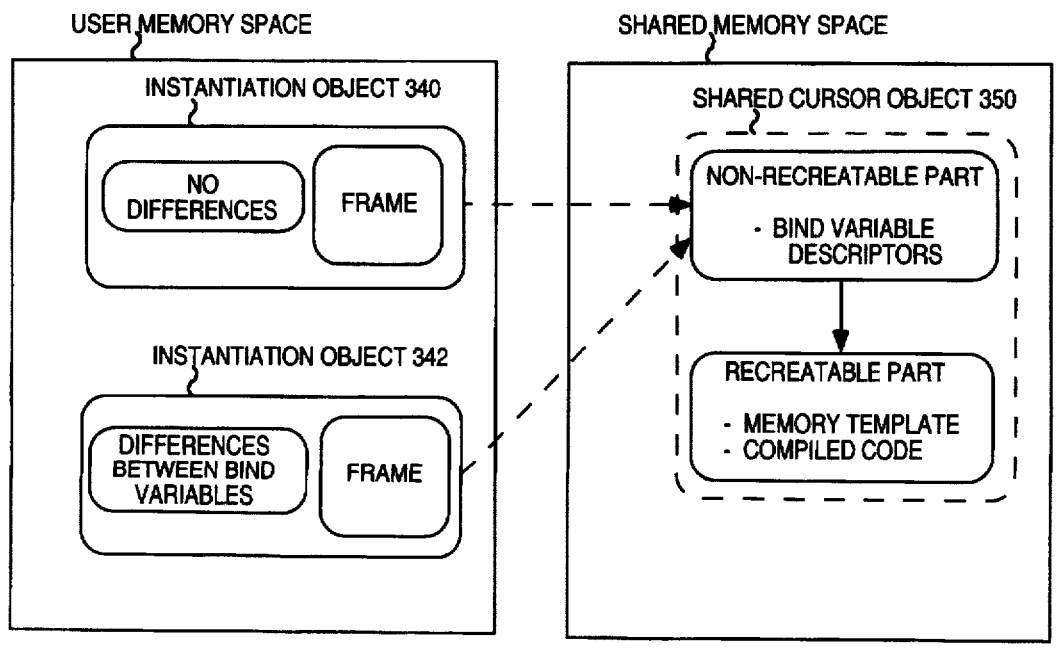
FIG. 3B is a block diagram illustrating certain example database objects utilized by a database management system according to one embodiment of the invention.

FIG. 3B is a block diagram illustrating certain example database objects utilized by a database management system according to one embodiment of the invention. FIG. 3B shows instantiation objects 340 and 342 linked to a shared cursor object 350. The memory for the instantiation objects 340 and 342 is allocated from the user memory space, while the memory for the shared cursor object 350 is allocated from the shared memory space. In one embodiment, one large contiguous memory area is allocated for each instantiation object and/or each shared cursor object. In an alternative embodiment, the memory required for each instantiation object and/or each shared cursor object is allocated as a set of smaller memory areas. The memory areas making up each set of memory areas need not be contiguous. In the embodiment in which separate sets of memory areas are allocated for each instantiation object and/or each shared cursor object, a set of reference data is maintained for each set of memory areas that identifies the location and use of each of the memory areas in that set of memory areas.

Like the previously described shared cursor objects, the shared cursor object 350 is divided into a recreateable part and a non-recreateable part. The recreateable part associated with a shared cursor object 350 includes the execution plan for the cursor and a parsed representation of the query that resulted in the initial creation of the shared cursor object 350. The non-recreateable part associated with the shared cursor object 350 includes the data that must be present to determine if other queries can use the execution plan associated with the shared cursor object 350 and to recreate the execution plan associated with the shared cursor object 350 if the recreateable part associated with the shared cursor object 350 is deallocated. The non-recreateable part associated with the shared cursor object 350 includes the bind variable descriptors. Of course, the bind variable descriptors may be stored using any number of different data structures, including those previously described with reference to Oracle 7.0. In alternative embodiments, the data stored in shared cursor objects may be distributed between the recreateable and non-recreateable parts in a different manner than described above. In addition, in alternative embodiments, each shared cursor object may be divided into more than two parts or may not be divided into separate parts at all. Furthermore, alternative embodiments may be implemented to selectively utilize shared cursors. For example, non-shared cursor objects may be created that perform the same functions as shared cursor objects, except only one instantiation object can be linked to each non-shared cursor object.

In the example show in FIG. 3B, the bind variables descriptors in the shared cursor object 250 accurately describe the bind variables associated with the instantiation object 340, but do not accurately describe the bind variables associated with the instantiation object 342. Data is stored in the instantiation object 340 indicating the bind variables associated with the instantiation object 340 are accurately described. In one embodiment, the bind variable descriptors in the shared cursor object accurately describe the bind variables associated with an instantiation object when: 1) the shared cursor object was originally created for the query associated with that instantiation object; or 2) the shared cursor object was previously created for a query having bind variables with the same attributes as the bind variables for that instantiation object.

Since the attributes of the bind variables associated with the instantiation object 342 and the shared cursor object 350 differ, data is maintained in the instantiation object 342 describing how the attributes of the bind variables associated with the instantiation object 342 differ from the attributes of the bind variables associated with the shared cursor object 350. Aside from the difference in the data stored to represent bind variables, instantiation objects used in embodiments of the invention may be the same as the instantiation objects described with reference to Oracle 7.0.

While one aspect of the invention is that only data indicating the differences, if any, of the bind variables are maintained in the instantiation objects, the invention is not limited to embodiments which never store bind variable descriptors as part of instantiation objects. For example, the server portion could be implemented to temporarily store bind variable descriptors as part of an instantiation object, and then later deallocate the memory used to store the bind variable descriptors as described below. In one embodiment which performs such storage and subsequent deallocation in an instantiation object, the same data and the same data structures may be used to store the bind variable descriptors in both the instantiation object and the shared cursor object.

Figure 4A:
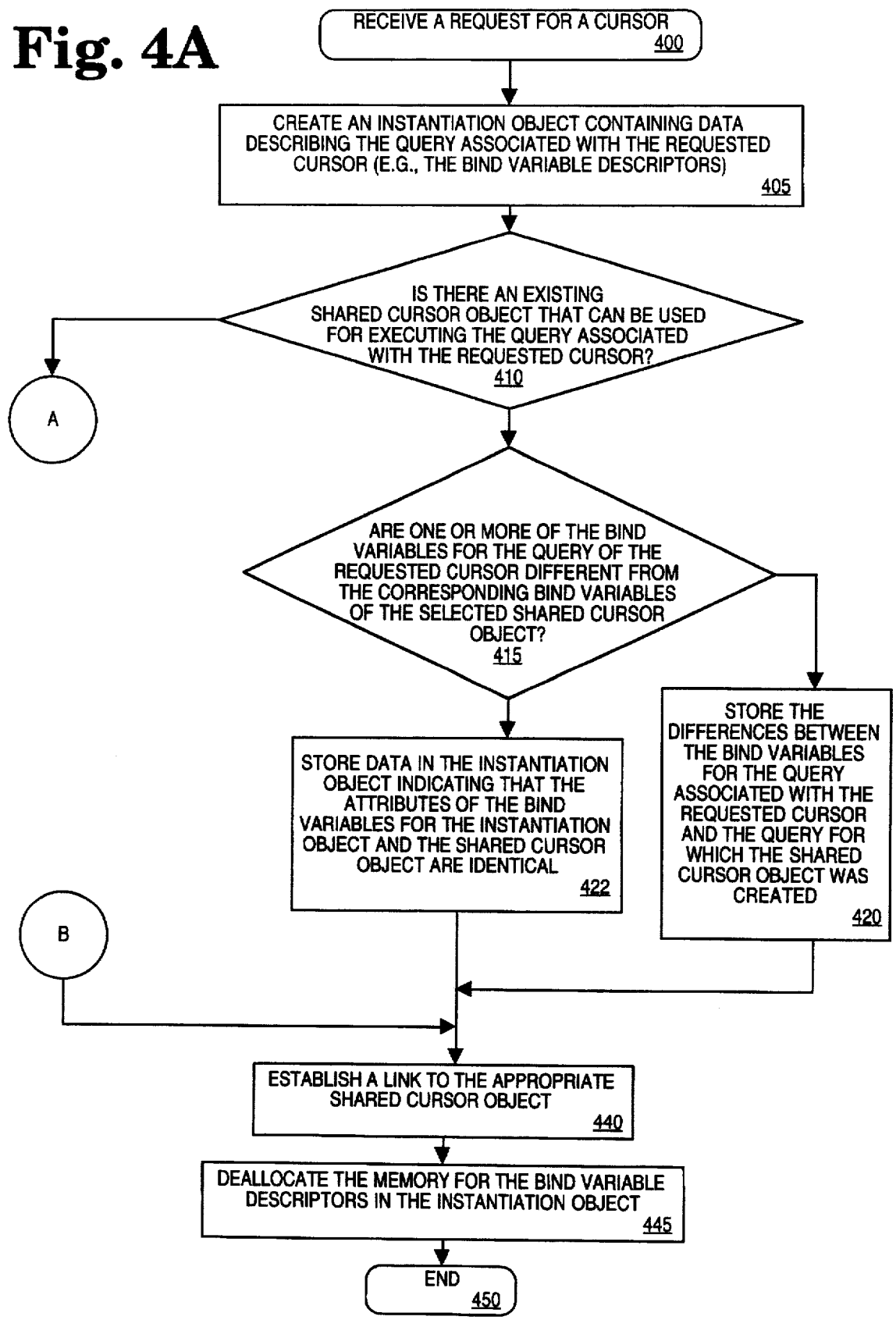
FIG. 4A illustrates part of a flow diagram for a method to create and link an instantiation object according to one embodiment of the invention.
Figure 4B:
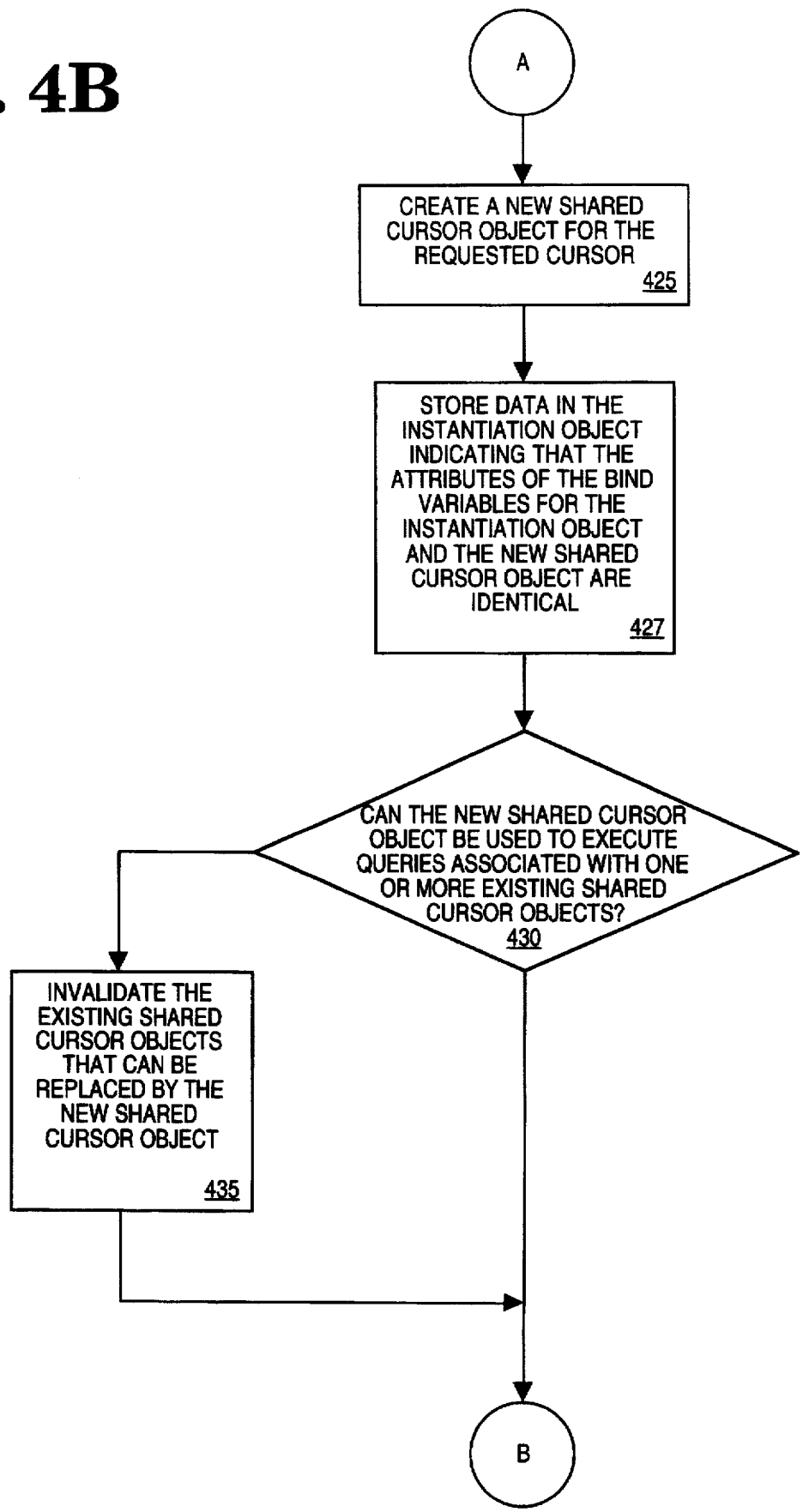
FIG. 4B illustrates the remainder of the flow diagram partially illustrated in FIG. 4A.

FIGS. 4A and B illustrate a flow diagram for a method to create and link an instantiation object according to one embodiment of the invention. While in one embodiment of the invention, the steps shown in FIG. 4 are performed by the server program interface 320, the cursor unit 332 and the compilation engine 326, alternative embodiments could distribute the processing required for these steps any number of ways. The flow diagram starts at step 400 where a request for a cursor is received by the server. For example, the request in step 400 would be generated upon the execution of a SQL PARSE statement by the client application. Thus, the request in step 400 would include the necessary data for creating an instantiation object and linking that instantiation object to a shared cursor object. While one embodiment is described in which these steps are performed in response to a PARSE statement, alternative embodiments could be implemented to perform these steps in response to a different statement or only upon the execution of another statement (e.g., a SQL EXECUTE statement for the cursor). From step 400, control passes to step 405.

As shown in step 405, an instantiation object is created containing data describing the query associated with the requested cursor (e.g., the bind variable descriptors, etc.) and control passes to step 410. To perform step 405, the cursor unit 332 allocates memory from the user memory space for the instantiation object and stores the appropriate data in that memory. While in one embodiment, the bind variable descriptors for the bind variables associated with the instantiation object are temporarily stored as part of that instantiation object, alternative embodiments could be implemented to temporarily store the bind variable descriptors in one or more memory areas for the requested cursor that are separate from the instantiation object.

In step 410, it is determined if there is an existing shared cursor object that can be used for the requested cursor. If there is an existing shared cursor object that can be used, control passes to step 415. Otherwise, control passes to step 425. In one embodiment, this step is performed in the same or a similar manner to that previously described with reference to Oracle 7.0. Thus, in addition to performing the other required comparisons, the cursor unit 332 compares the bind variable descriptors stored as part of the instantiation object created in step 405 with the bind variable descriptors stored as part of each existing shared cursor object.

If an existing shared cursor object can be used for the requested cursor, it is determined if one or more of the bind variables associated with the requested cursor are different (e.g., shorter) than the corresponding bind variables associated with that shared cursor object (step 415). If one or more of the bind variables are different, control passes to step 420. Otherwise, control passes to step 422. Step 415 is performed by comparing the bind descriptors stored as part of the instantiation object with the bind descriptors stored as part of the shared cursor object identified in step 410.

In step 420, data describing the differences between the attributes of the bind variables associated with the requested cursor and the attributes of the bind variables associated with the shared cursor object are stored in the instantiation object. From step 420, control passes to step 440.

As shown in step 422, data indicating that there are no differences between the attributes of the bind variables associated with the instantiation object and the shared cursor object is stored as part of the instantiation object. From step 422, control passes to step 440.

If an existing shared cursor object cannot be used for the requested cursor, a new shared cursor object is created for the requested cursor as shown in step 425. In one embodiment, the new shared cursor object is created to execute the requested cursor and the bind variable descriptors stored as part of the new shared cursor object accurately described the bind variables of the requested cursor. From step 425, control passes to step 427.

As shown in step 427, data indicating that there are no differences between the attributes of the bind variables associated with the instantiation object and the new shared cursor object is stored as part of the instantiation object. From step 427, control passes to step 430.

In an alternative embodiment, the new shared cursor object is created for a query having bind variables with attributes as close to the most commonly required attributes for bind variables as possible, while still being usable for the requested cursor. For example, if the most common length for an integer value is X bytes, then any integer bind variable for the new shared cursor object is implemented with a length of X bytes (even if the corresponding bind variable of the requested cursor is shorter) unless the corresponding bind variable of the requested cursor is longer. If the corresponding bind variable of the requested cursor is longer, then the bind variable for the new shared cursor object is made to be at least as long as the corresponding bind variable of the requested cursor. By implementing the new shared cursor object using the most commonly required attributes for bind variables, the likelihood that other cursors will be able to utilize the shared cursor object is increased. In an embodiment which implements the new shared cursor object using the most commonly required attributes for bind variables, step 427 is replaced with steps similar to steps 415, 420, and 422 in which data is stored in the instantiation object indicating the differences, if any, between the bind variables for the query of the requested cursor and the corresponding bind variables of the new shared cursor object.

In step 430, it is determined if the new shared cursor object could be used to execute queries associated with one or more other shared cursor objects. If the new shared cursor object could be used to execute queries associated with one or more other shared cursor objects, control passes to step 435. Otherwise, control passes to step 440. In one embodiment, the new shared cursor object can be used to execute queries associated with an old shared cursor object if the new shared cursor object is identical to the old shared cursor object, with the exception that one or more bind variables associated with the new shared cursor object may be longer than the corresponding bind variables of the old shared cursor object.

In step 435, the existing shared cursor objects identified in step 430 are invalidated and control passes to step 440. Step 435 is performed by altering data (e.g., a valid bit) in the existing shared cursor objects from a valid state to an invalid state. As will be later described herein, instantiation objects associated with invalidated shared cursor objects are linked to the new shared cursor object. When an existing shared cursor object is no longer linked to any instantiation object, that shared cursor object is deallocated.

At step 440, the instantiation object is linked to the appropriate shared cursor object and control passes to step 445. For example, if a new shared cursor object was created in step 425, the instantiation object is linked to that shared cursor object. Alternatively, if an existing shared cursor object was found in step 410, the instantiation object is linked to that shared cursor object. The instantiation object is linked to the selected shared cursor object by storing a reference (e.g., a physical pointer, a unique integer identifier, etc.) in the instantiation object that identifies the appropriate shared cursor object. From step 440, control passes to step 445.

In step 445, the memory for the bind variable descriptors in the instantiation object is deallocated and control passes to step 450 where the flow diagram ends. By deallocating the memory for the bind variable descriptors, the memory required for the storage of bind variable descriptors is reduced. Since memory usage affects the number of clients that can be connected to a server, the performance of the database is improved.

While one embodiment has been described in which steps are taken to allow for the association of instantiation objects associated with bind variables having different attributes from the bind variables associated with a shared cursor object, alternative embodiments could be implemented such that an instantiation object can only be associated with a shared cursor object if the attributes of the bind variables are identical. Thus, the set of steps 415 and 420 and the set of steps 430, and 435 are both optional. For example, an alternative embodiment could be implemented such that the set of steps 415 and 420 and/or the set of steps 430 and 435 are not performed. In an embodiment in which the set of steps 415 and 420 are not performed, control passes directly from step 410 to step 440. In an embodiment in which the set of steps 430 and 435 are not performed, control passes directly from step 427 to step 440.

Figure 5:
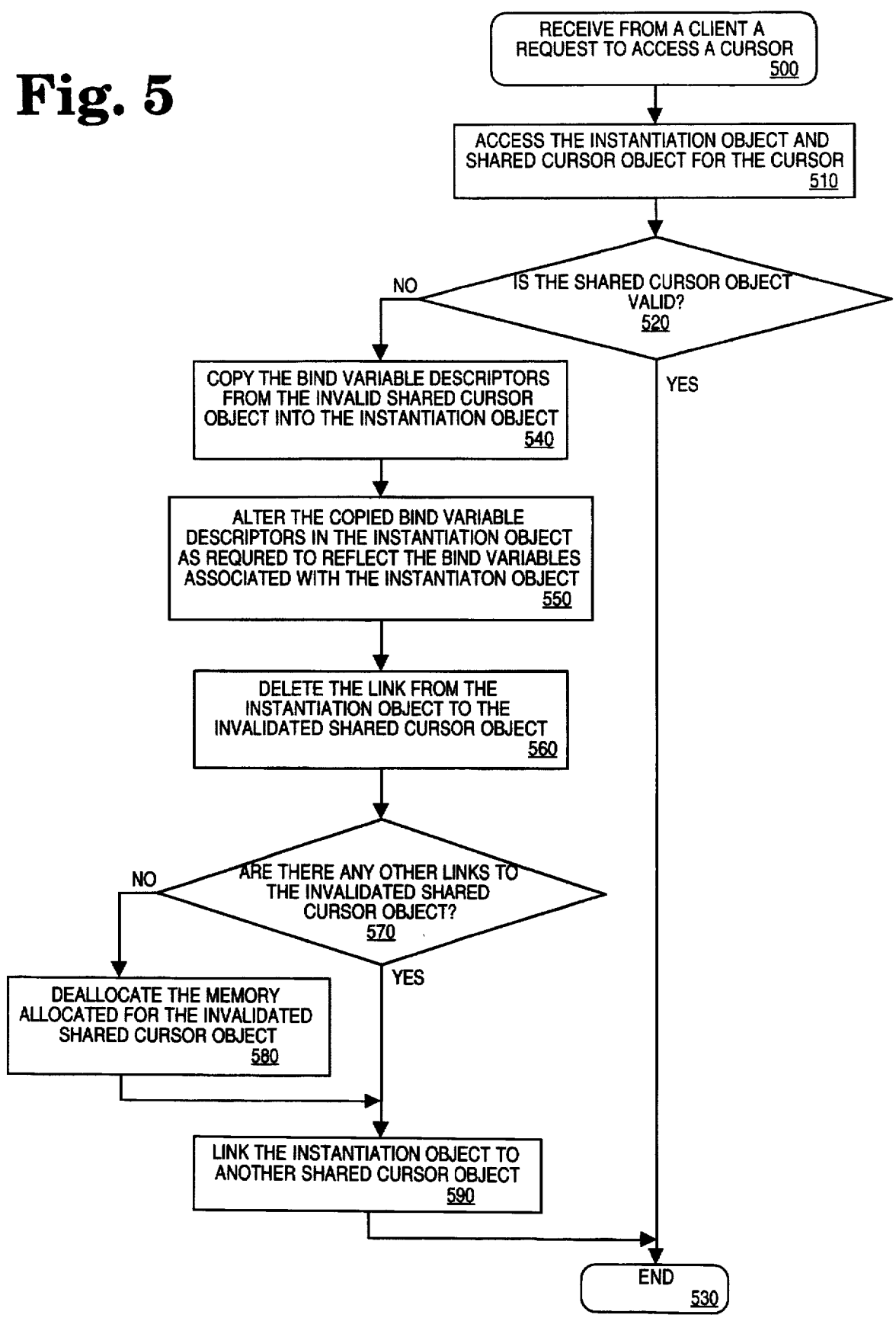
FIG. 5 is a flow diagram illustrating some of the steps performed when accessing a cursor according to one embodiment of the invention.

FIG. 5 is a flow diagram illustrating some of the steps performed when accessing a cursor according to one embodiment of the invention. The flow diagram starts at step 500, where a request to access a cursor is received by the server. The request of step 500 includes the necessary data to access that cursor and is generated upon the execution of a SQL BIND, FETCH, EXECUTE, or CLOSE statement by a client application. Control passes from step 500 to step 510.

As shown in step 510, the instantiation object and shared cursor object for the cursor are accessed and control passes to step 520. The instantiation object for the cursor is identified based on the data received from the client application. The shared cursor object for the cursor is identified using the reference stored as part of the instantiation object that creates the link to the appropriate shared cursor object.

As shown in step 520, it is determined if the shared cursor object is valid. If the shared cursor object is valid, control passes to step 530. Otherwise, control passes to step 540. Step 520 is performed by accessing the data previously described with reference to step 435 that indicates a valid state or an invalid state. As previously described, an existing shared cursor object is invalidated when a new cursor object is created that could be used to execute queries associated with that existing shared cursor object.

At step 540, the bind variable descriptors in the invalidated shared cursor object are copied into the instantiation object and control passes to step 550. Step 540 is performed because the bind variable descriptors are no longer stored in the instantiation object and the invalid shared cursor object will eventually be deleted.

At step 550, the bind variable descriptors copied into the instantiation object are altered as required such that the bind variable descriptors reflect the bind variables associated with the instantiation object. Step 550 is performed by accessing the data stored in the instantiation object indicating whether there are any differences between the attributes of the bind variables associated with the instantiation object and the bind variables associated with the invalidated shared cursor object. If the data stored in the instantiation object indicates that the bind variable descriptors copied from the shared cursor object accurately describe the bind variables associated with the instantiation object, then the bind variable descriptors stored in the instantiation object are not altered. However, if the data in the instantiation object describes differences between the attributes of the bind variables associated with the instantiation object and the invalidated shared cursor object, then the bind variable descriptors copied into the instantiation object are altered to accurately describe the bind variables associated with the instantiation object. Upon completion of step 550, the bind variable descriptors stored in step 550 are equivalent to the bind variable descriptors that were stored during step 405. From step 550, control passes to step 560.

As shown in step 560, the link from the instantiation object to the invalidated shared cursor object is deleted and control passes to step 570. Step 560 is performed by altering the reference stored in the instantiation object that establishes the link to the invalidated shared cursor object.

In step 570, it is determined if there are any other links to the invalidated shared cursor object. If there are not any other links to the invalidated shared cursor object, control passes to step 580. Otherwise, control passes to step 590. In one embodiment, step 570 is performed by maintaining a counter in the shared cursor object that indicates the number of instantiation objects that are linked to that shared cursor object.

As shown in step 580, the invalidated shared cursor object is deallocated. From step 580, control passes to step 590.

At step 590, the instantiation object is linked to another shared cursor object and control passes to step 530. Since the shared cursor object to which the instantiation object was linked was invalidated, a new shared cursor object was previously created that could be used for this instantiation object as described with reference to steps 430 and 435 of FIG. 4. Step 590 is performed by the steps illustrated in the flow diagram shown in FIG. 4 starting at step 410 in an attempt to locate this new shared cursor object and link the instantiation object to this new shared cursor object. If for some reason the new shared cursor object was already deleted, another shared cursor object will be created as described with reference to FIG. 4. In an alternative embodiment, the attempt to locate the new shared cursor object is performed prior to deallocating the memory for the invalidated shared cursor object. In the alternative embodiment in which the attempt to locate the new shared cursor is performed prior to deallocating the memory for the invalidated shared cursor object, if the new shared cursor object cannot be located, the invalidated shared cursor object is re-validated, the instantiation object remains linked to that shared cursor object, and that shared cursor object is used to implement the cursor.

Figure 6:
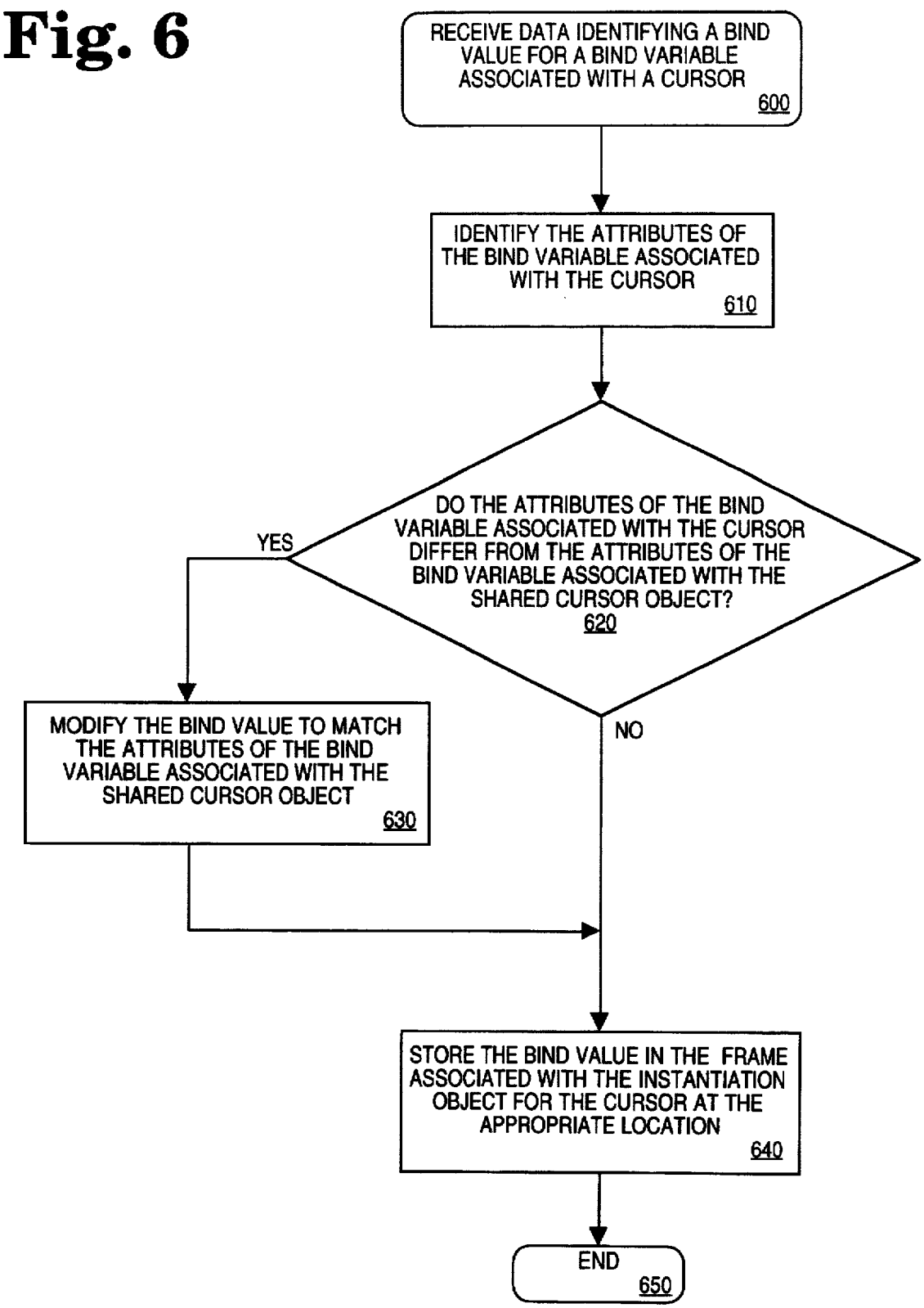
FIG. 6 is a flow diagram illustrating steps performed in addition to those described in FIG. 5 when a bind value for a bind variable associated with a cursor is received by the server according to one embodiment of the invention.

FIG. 6 is a flow diagram illustrating steps performed in addition to those described in FIG. 5 when a bind value for a bind variable associated with the cursor is received by the server according to one embodiment of the invention. The flow diagram starts at step 600, where data identifying a value for a bind variable (referred to herein as the "bind value") associated with a cursor is received by the server. For example, the data of step 600 is generated upon the execution of a SQL BIND statement by the client application. Control passes from step 600 to step 610.

As shown in step 610, the attributes of the bind variable associated with the cursor are determined, and control passes to step 620. To perform step 610, the cursor unit first determines the location of the bind variable in the predicate of the query associated with the cursor. Based upon the location in the predicate of the bind variable, the cursor unit accesses the bind variable descriptor for that bind variable from the shared cursor object identified while performing the steps of the flow diagram described with reference to FIG. 5. In addition, the cursor unit inspects the data in the instantiation object indicating if the attributes of the bind variable associated with the instantiation object differ from the attributes of the bind variable associated with the shared cursor object. Using the bind descriptor for the bind variable and the data accessed from the instantiation object, the cursor unit determines the attributes of the bind variable associated with the cursor. From step 610, control passes to step 620.

At step 620, it is determined whether the attributes of the bind variable associated with the instantiation object differ from the attributes of the bind variable associated with the shared cursor object. If the attributes of the bind variable associated with the instantiation object differ from the attributes of the bind variable associated with the shared cursor object, control passes to step 630. Otherwise, control passes to step 640.

In step 630, the bind value is modified to match the attributes of the bind variable associated with the shared cursor object and control passes to step 640. For example, if the bind variable associated with the instantiation object is shorter than the corresponding bind variable associated with the shared cursor object, the length of the bind value is increased (e.g., the bind value is padded with zeroes).

In step 640, the bind value is stored in the frame associated with the instantiation object at the appropriate location and control passes to step 650 where the flow diagram ends. To perform step 640, the cursor unit accesses the memory template in the shared cursor object to identify the appropriate location for the bind variable in the frame associated with the instantiation object.

In an alternative embodiment in which the complied code generated for the cursor is implemented to determine the length of a bind variable prior to accessing the value associated with that bind variable and to access only up to the identified length, steps 610, 620 and 630 need not be performed and flow passes directly from step 600 to step 640.

ALTERNATIVE EMBODIMENTS

The invention is not limited to a database implemented to allow instantiation objects to be linked to shared cursor objects only when the bind variables for the query associated with the shared cursor object are longer. For example, a database could be implemented which allowed an instantiation object to be associated with a shared cursor object for a query including bind variables of a different data type. In such a case, data indicating the differences between the data types would be stored in the instantiation object and the cursor unit would be implemented to convert the data associated with the bind variables received from the client application into the data types of the bind variables associated with the shared cursor object.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for executing queries on a server, said method comprising the computer implemented steps of:
    storing in a first memory space a first private object for executing a first query from one or a set of clients, wherein said first private object is private to said first query;
    storing in a second memory space a first shared object;
    storing in said first shared object data describing attributes of a set of bind variables for a particular query;
    storing in said first private object data establishing a link to said first shared object;
    if differences exist between attributes of a set of bind variables for said first query and attributes of the set of bind variables for said particular query, then storing data in said first private object indicating the differences between attributes of the set of bind variables for said first query and attributes of the set of bind variables for said particular query;
    generating compiled code required to execute said particular query;
    storing said compiled code in said first shared object; and
    executing said first query using the data and the compiled code stored in said first shared object, as well as the data stored in said first private object.

2. The method of claim 1, further comprising the steps of:
    deallocating the memory in said second memory space that has stored therein said compiled code;
    determining said first query must be reexecuted;
    regenerating said compiled code;
    storing in said first shared object said compiled code; and
    reexecuting said first query using the data and the compiled code stored in said first shared object, as well as the data stored in said first private object.

3. The method of claim 1, wherein:
    each bind variable in the set of bind variables for said particular query corresponds to a different bind variable in said set of bind variables for said first query; and
    said method further comprises the step of selecting each bind variable in the set of bind variables for said particular query to be at least as long as the corresponding bind variable in the set of bind variables for said first query.

4. The method of claim 1, further comprising the steps of:

storing in said first private object data describing attributes of the set of bind variables for said first query; and deallocating the memory allocated for said first private object that has stored therein the data describing attributes of the set of bind variables for said first query.

5. The method of claim 1, further comprising the steps of:

storing in a third memory space a second private object for executing a second query from one of said set of clients, wherein said second private object is private to said second query;

determining that the execution of said particular query or said second query can be performed by executing the same compiled code;

storing in said second private object data establishing a link to said first shared object;

if differences exist between attributes of a set of bind variables for said second query and attributes of the set of bind variables for said particular query, then storing data in said second private object indicating the differences between attributes of the set of bind variables for said second query and attributes of the set of bind variables for said particular query; and executing said second query using the data and the compiled code stored in said first shared object, as well as the data stored in said second private object.

6. The method of claim 5, wherein:

each bind variable in the set of bind variables for said second query corresponds to a different bind variable in the set of bind variables for said particular query; and said method further comprises the step of:

determining an attribute of a first bind variable in said set of bind variables for said second query differs from said corresponding bind variable in said set of bind variables for said particular query.

7. The method of claim 6, wherein said first bind variable in the set of bind variables for said second query is shorter than said corresponding bind variable in the set of bind variables for said particular query.

8. The method of claim 6, wherein said first bind variable in the set of bind variables for said second query is of a different data type than said corresponding bind variable in the set of bind variables for said particular query.

9. The method of claim 6, wherein said step of executing said second query further comprises the steps of:

receiving data representing a value for said first bind variable in the set of bind variables for said second query;

altering the data representing said value for said first bind variable to match the attributes of said corresponding bind variable in the set of bind variables for said particular query; and storing the altered data representing said value as part of said second private object prior to executing said second query.

10. The method of claim 5, wherein said first query and said second query are identical.

11. The method of claim 1, further comprising the steps of:

storing in a third memory space a second private object for executing a second query from one of said set of clients, wherein said second private object is private to said second query;

storing in a fourth memory space a second shared object;

storing in said first shared object data describing attributes of a set of bind variables for a new query;

storing in said second private object data establishing a link to said second shared object;

if differences exist between attributes of a set of bind variables for said second query and attributes of the set of bind variables for said new query, then storing data in said second private object indicating the differences between attributes of the set of bind variables for said second query and attributes of the set of bind variables for said new query; and generating compiled code required to execute said new query;

storing in said second shared object said compiled code required to execute said new query;

executing said second query using the data and the compiled code stored in said second shared object, as well as the data stored in said second private object;

determining that the execution of said first query can be performed by executing the compiled code generated to execute said new query;

storing in said first private object data establishing a link to said second shared object;

if differences exist between attributes of the set of bind variables for said first query and attributes of the set of bind variables for said new query, then storing data in said first private object indicating the differences between attributes of the set of bind variables for said first query and attributes of the set of bind variables for said new query;

deallocating the memory in said second memory space that has stored therein said first shared object; and executing said first query using the data and the compiled code stored in said second shared object, as well as the data stored in said first private object.

12. The method of claim 1, wherein said first query and said particular query are identical.

13. A method for storing data describing attributes of bind variables for a first query, said method comprising the computer-implemented steps of:

A) receiving a request to create a cursor for said first query, wherein the data accessible using said cursor is the data in a database that satisfies said first query;

B) allocating a first set of one or more memory areas for storing data for said cursor;

D) determining if one of a plurality of objects can be used to execute said first query, wherein each object in said plurality of objects is for storing data and compiled code for executing a query associated with said object, wherein each object of said plurality of objects has stored therein a set of data describing attributes of the bind variables for said query associated with said object; and E) if one of said plurality of objects can be used to execute said first query, then performing the steps of:

E1) Selecting as a selected object the one of said plurality of objects that can be used to execute said first query;

E2) if differences exist between attributes of the bind variables for said first query and attributes of the bind variables for the query associated with said selected object, then storing data in said first set of one or more memory areas indicating how attributes of the bind variables for said first query differ from attributes of the bind variables for the query associated with said selected object; and B3) storing in said first set of one or more memory areas data associating said cursor with said selected object.

14. The method of claim 13 further comprises the steps of:

storing in a subset of said first set of one or more memory areas data describing attributes of the bind variables for said first query, wherein the data in said database that satisfies said first query depends upon the values selected for the bind variables for said first query; and deallocating said subset of said first set of one or more memory areas.

15. The method of claim 13 further comprises the steps of:

F) if one of said plurality of objects cannot be used to execute said first query, then performing the steps of:
F1) adding a new object to said plurality of objects that can be used to execute said first query; and
F2) storing in said first set of one or more memory areas data associating said cursor with said new object.

16. The method of claim 15, wherein:

if one of said plurality of objects cannot be used to execute said first query, then also performing the step of if differences exist between attributes of the bind variables for said first query and attributes of the bind variables for the query associated with said selected object, then storing data in said first set of one or more memory areas indicating how attributes of the bind variables for said first query differ from attributes of the bind variables for the query associated with said selected object.

17. The method of claim 15, wherein:

said step of adding said new object comprises the steps of:
allocating a second set of one or more memory areas for said new object; and
storing in said second set of one or more memory areas a second set of data describing attributes of the bind variables for said first query;

said method further comprising the steps of:
allocating a third set of one or more memory areas for said new object;
generating compiled code required to execute said first query;
storing said compiled code in said third set of one or more memory spaces; and
executing said compiled code to execute said first query.

18. The method of claim 13, wherein the attributes of one or more of the bind variables for said first query differ from the attributes of the corresponding bind variables for said query associated with said selected object in that the one or more of said bind variables for said first query are shorter.

19. The method of claim 13, wherein the attributes of one or more of the bind variables for said first query differ from the attributes of the corresponding bind variables for said query associated with said selected object in that the one or more of said bind variables for said first query are of a different data type.

20. A method for executing queries on a server, said method comprising the computer implemented steps of:

storing in a first memory space a first private object for executing a first query from one of a set of clients, wherein said first private object is private to said first query;

storing in a second memory space a first shared object;

storing in said first shared object data describing attributes of a set of bind variables for said first query;

storing in said first private object data establishing a link to said first shared object;

generating compiled code required to execute said first query;

storing said compiled code in said first shared object;

executing said first query using the data and the compiled code stored in said first shared object, as well as the data stored in said first private object;

storing in a third memory space a second private object for executing a second query from one of said set of clients, wherein said second private object is private to said second query;

determining that the execution of said first query or said second query can be performed by executing the same compiled code;

storing in said second private object data establishing a link to said first shared object;

if differences exist between attributes of a set of bind variables for said second query and attributes of the set of bind variables for said first query, then storing data in said second private object indicating the differences between attributes of the set of bind variables for said second query and attributes of the set of bind variables for said first query; and executing said second query using the data and the compiled code stored in said first shared object, as well as the data stored in said second private object.

21. The method of claim 20, further comprising the steps of:

deallocating the memory in said second memory space that has stored therein said compiled code;

determining said first query must be reexecuted;

regenerating said compiled code;

storing in said first shared object said compiled code; and reexecuting said first query using the data and the compiled code stored in said first shared object, as well as the data stored in said first private object.

22. The method of claim 20, wherein:

each bind variable in the set of bind variables for said second query corresponds to a different bind variable in the set of bind variables for said first query; and said method further comprises the step of:
determining an attribute of a first bind variable in said set of bind variables for said second query differs from said corresponding bind variable in said set of bind variables for said first query.

23. The method of claim 22, wherein said first bind variable in the set of bind variables for said second query is shorter than said corresponding bind variable in the set of bind variables for said first query.

24. The method of claim 22, wherein said first bind variable in the set of bind variables for said second query is of a different data type than said corresponding bind variable in the set of bind variables for said first query.

25. The method of claim 22, wherein said step of executing said second query further comprises the steps of:

receiving data representing a value for said first bind variable in the set of bind variables for said second query;

altering the data representing said value for said first bind variable to match attributes of said corresponding bind variable in the set of bind variables for said first query; and storing the altered data representing said value as part of said second private object prior to executing said second query.

26. A database system comprising:

a set of one or more memory devices;

a shared object stored in said set of one or more memory devices;

data storing in said shared object describing attributes of a set of bind variables for a particular query;

compiled code stored in said shared object, said compiled code for executing said particular query;

a first private object stored in said set of one or more memory devices, said first private object being private to a client that requested execution of a first query, said first private object not having stored therein attributes of a set of bind variables for said first query;

data stored in said first private object establishing a link to said shared object; and a first series of one or more instructions, which when executed by one or more processors, causes said one or more processors to execute said first query using said shared object and said first private object.

27. The database system of claim 26, further comprising:

data stored in said first private object indicating the differences, if any, between attributes of the set of bind variables for said first query and attributes of the set of bind variables for said particular query.

28. The database system of claim 26 further comprising:

a second private object stored in said set of one or more memory devices, said second private object being private to the a client that requested execution of a second query, said private object not having stored therein attributes of a set of bind variables for said second query;

data stored in said second private object establishing a link to said shared object, and a second series of one or more instructions, which when executed by said one or more processors, causes said one or more processors to execute said second query using said shared object and said second private object.

29. The database system of claim 28, wherein said second query and said particular query are identical.

30. The database system of claim 28, further comprising:

data stored in said second private object indicating whether attributes of the set of bind variables for said second query differ from attributes of the set of bind variables for said particular query.

31. The database system of claim 26, further comprising:

data stored in said second private object indicating the differences, if any, between attributes of the set of bind variables for said second query and attributes of the set of bind variables for said particular query.

32. The database system of claim 28, wherein said client that requested execution of said second query is said client that requested execution of said first query.

* * * * *